United States Patent [19]

McFarland

[11] 4,042,140
[45] Aug. 16, 1977

[54] SELF-LOADING AND UNLOADING HAY BALE TRAILER

[75] Inventor: Douglas F. McFarland, Davis City, Iowa

[73] Assignee: Farmhand, Inc., Hopkins, Minn.

[21] Appl. No.: 604,252

[22] Filed: Aug. 13, 1975

Related U.S. Application Data

[63] Continuation of Ser. No. 464,449, April 26, 1974.

[51] Int. Cl.² .................................................. B60P 1/38
[52] U.S. Cl. ..................................... 214/518; 214/78; 214/DIG. 4
[58] Field of Search ........................... 214/518–522, 214/77, 78, 130 C, 130 R, DIG. 4, 613; 198/7 BL; 280/462

[56] References Cited

U.S. PATENT DOCUMENTS

| | | | |
|---|---|---|---|
| 2,963,303 | 12/1960 | Young et al. | 280/462 |
| 3,341,039 | 9/1967 | Cranage | 214/83.26 |
| 3,362,547 | 1/1968 | Kovarik | 214/518 X |
| 3,561,627 | 2/1971 | Fisher | 214/518 |
| 3,675,802 | 7/1972 | Best et al. | 198/7 BL X |
| 3,841,504 | 10/1974 | Spasuik | 214/78 |
| 3,942,666 | 3/1976 | Pfremmer | 214/518 |

FOREIGN PATENT DOCUMENTS 1,577,020  6/1969  France ........................ 214/78

*Primary Examiner*—Albert J. Makay
*Attorney, Agent, or Firm*—Dorsey, Windhorst, Hannaford, Whitney & Halladay

[57] ABSTRACT

A trailer includes a tongue which may be pivoted from a center position to either side by operation of one of the brakes on the ground support wheels. A L-shaped loading fork is provided at the forward end pivotal from a position where the forwardly extending legs of the fork move under the bale to a position where they extend upwardly and the other legs extend rearwardly along the trailer frame. A pair of conveyors are provided along the length of the frame for moving the hay from one end to the other and for unloading the hay. An unloading apparatus is provided at the rear end which includes oppositely disposed upstanding posts having vertically pivotal arms to which are connected horizontally disposed stub shafts for engaging the bale at its axial center. The bale is rotated by engagement with a conveyor on its lower side thereby unrolling it as it is rotated.

9 Claims, 13 Drawing Figures

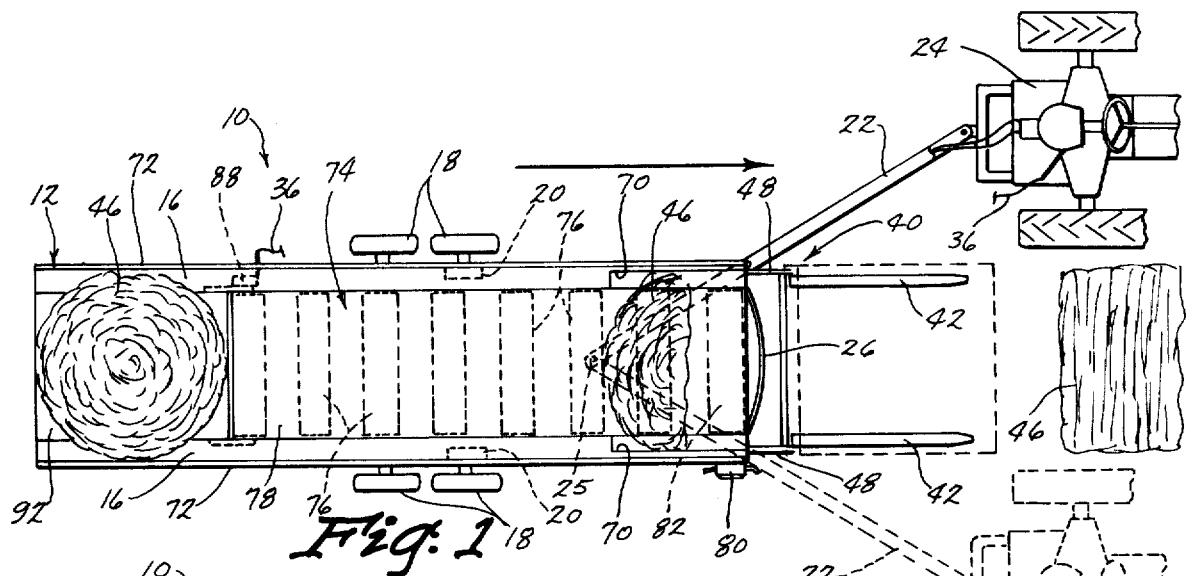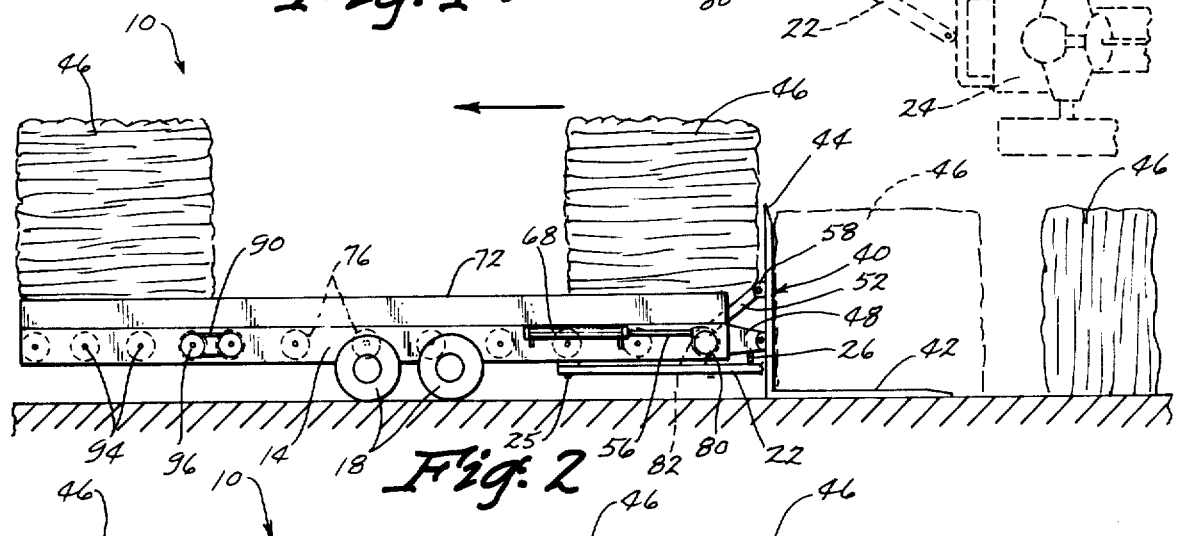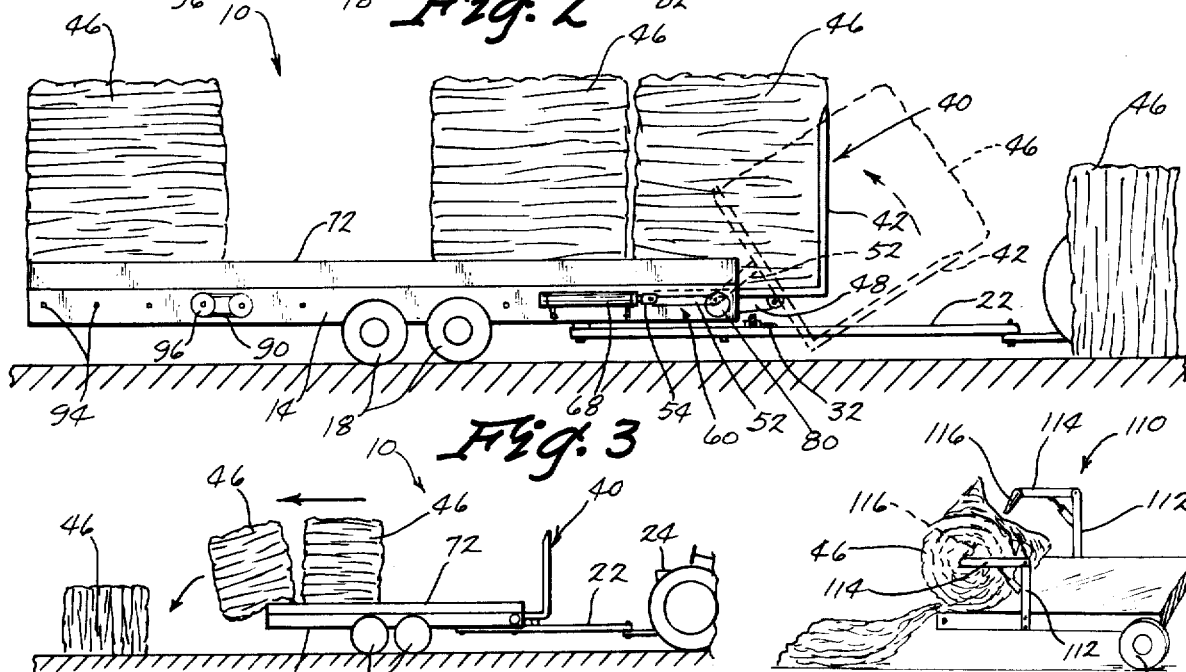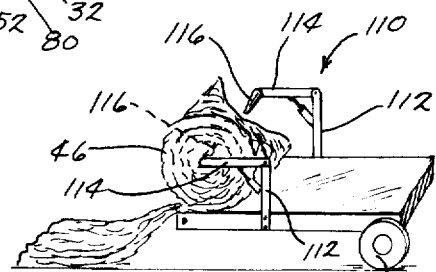

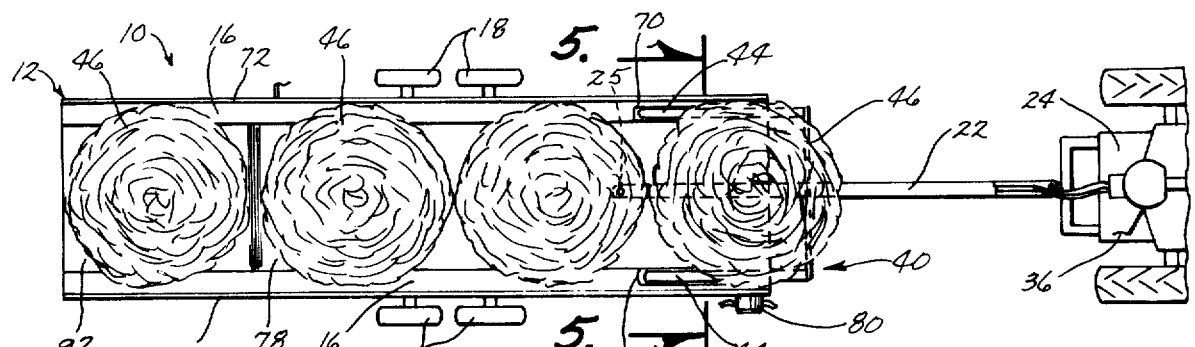
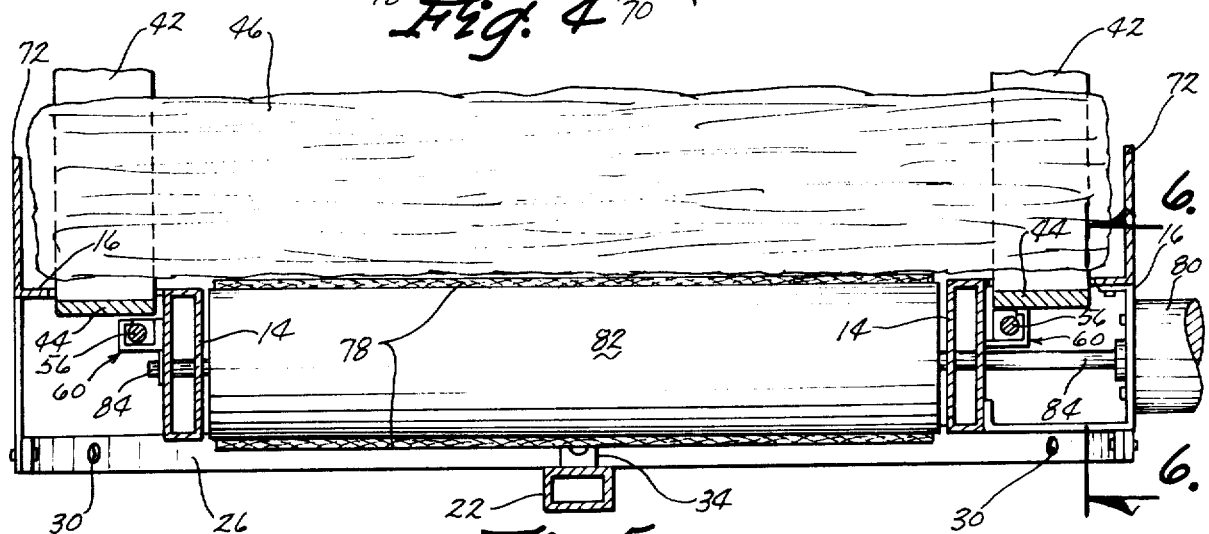
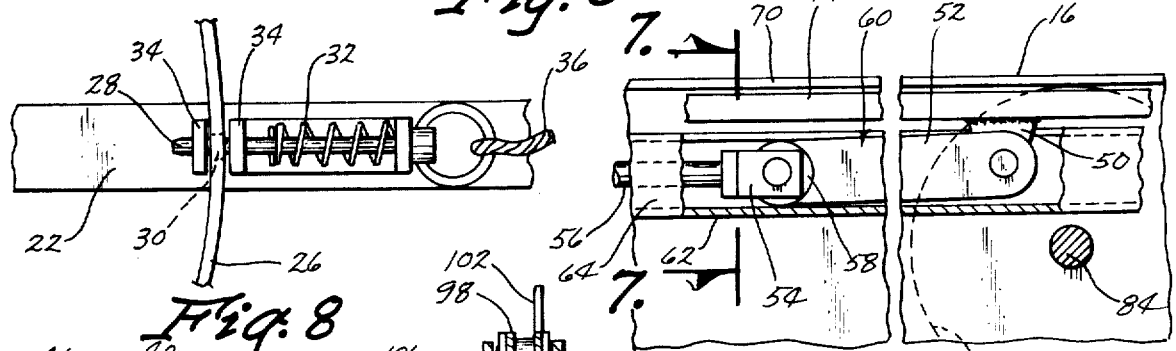
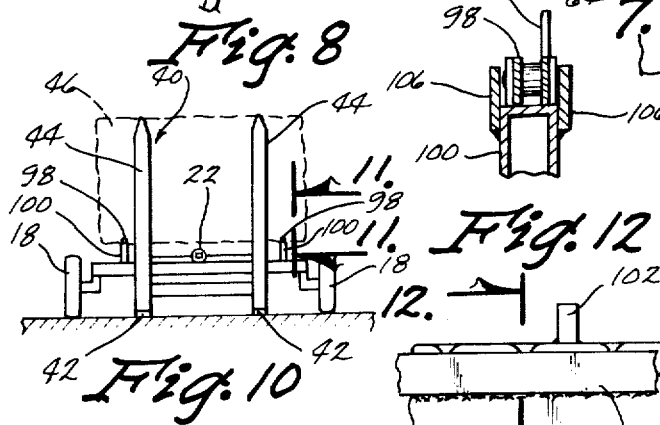
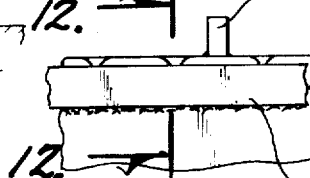

SELF-LOADING AND UNLOADING HAY BALE TRAILER

This is a continuation, of application Ser. No. 464,449, filed Apr. 26, 1974.

The processing of hay through the use of large round bales on the order of 1,600 pounds and five feet in diameter, presents unique problems in terms of loading, unloading and transporting these bales as well as in the unrolling or unbaling of the bales for feeding purposes. One of the common handling techniques is to use a forklift on a tractor but this approach only accommodates one bale at a time and if the fork is rear mounted it is inconvenient to see it operate and requires operating the tractor in reverse much of the time. The handling operations are multiplied by virtue of the fact that the fork places it on a trailer or the like and then at the point of use another fork has to remove it from the trailer. Additionally, two different tractors are required, one for the fork and the other for pulling the trailer.

The self-loading and unloading hay bale trailer of this invention accomplishes all three objectives. It will load the bales onto the trailer and provide for their being unloaded at the point of use. Only one tractor is required and the whole operation can be handled by one man. The heart of the loading operation is an L-shaped fork pivotally connected to the forward end of the trailer. This fork is positioned to have the forwardly extending legs extend under the bale as the trailer moves forwardly whereupon the fork is rotated ninety degrees moving the bale onto the trailer which includes a conveyor for moving the bale to the rear of the trailer for transport or for unloading by a second conveyor at the rear end.

The tongue of the trailer is readily pivotal to one side or the other from the centerline transport position to allow the fork to extend forwardly along the ground for loading the bales. A pair of power cylinders are positioned on the frame and are connected by links to the other legs of the fork to cause pivoting of the fork between loading and transport positions. A trailer and tongue may be pivoted relative to each other by independent operation of brakes on the ground support wheels or by backing the tractor thereby causing the tongue to pivot to one side or the other leaving the front of the trailer clear for loading operations.

The unloading of the bales may be accomplished in one of two ways. First, the rear conveyor may be operated to move the bale off of the trailer. Secondly, the unloading apparatus may be operated which involves upstanding posts on opposite sides of the frame having rearwardly and downwardly extending arms with inwardly extending stub shafts for engaging the bale at its axial center. The rear conveyor is operated causing the bale to rotate thereby unrolling or unbaling it from the trailer.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a top plan view of the hay bale trailer of this invention showing the tongue pivoted between positions either side of the centerline transport position.

FIG. 2 is a side elevational view thereof.

FIG. 3 is a view similar to FIG. 2 showing the fork in operation between loading and transport positions.

FIG. 4 is a reduced in scale top plan view showing the trailer in its loaded condition ready for transport.

FIG. 5 is an enlarged in scale cross sectional view taken along line 5 — 5 in FIG. 4.

FIG. 6 is a cross sectional view taken along line 6 — 6 in FIG. 5.

FIG. 7 is a cross sectional view taken along line 7 — 7 in FIG. 6.

FIG. 8 is a top plan fragmentary view of the locking mechanism associated with the tongue.

FIG. 9 is a reduced in scale side elevation view showing the bales being unloaded through operation of the rear conveyor.

FIG. 10 is a front elevation view of the trailer showing an alternate conveyor system.

FIG. 11 is a cross sectional view taken along line 11 — 11 in FIG. 10.

FIG. 12 is a cross sectional view taken along line 12 — 12 in FIG. 11, and

FIG. 13 is a reduced in scale perspective view showing a trailer including the unloading apparatus for unrolling the hay bale.

The self-loading and unloading hay bale trailer of this invention is referred to in FIG. 1 generally by the reference numeral 10 and is seen in FIG. 5 to include a frame 12 having side rectangular channel members 14 to the outside of which square channel members 16 are rigidly connected. Four ground support wheels 18 are provided and the forward two wheels include individually operated brakes 20.

A forwardly extending tongue 22 is connected to a tractor 24. The tongue is pivotally connected at 25 to the trailer and is pivotal between the solid and dash line positions of FIG. 1 which are on either side of a centerline transport position as seen in FIG. 4. The trailer frame supports a guide track 26 as seen in FIG. 8 and a locking pin 28 is positioned to register with openings 30 in the track to hold the tongue on one of the three desired positions. The pin 28 is spring biased by a spring 32 to a extended locked position wherein it is extended through openings in plates 34 forming a passageway for the track 26. A rope 36 is connected to the pin 28 and in turn is connected to the tractor adjacent the driver's station for operation by the operator of the tractor from the tractor seat, as seen in FIG. 1. A tongue may be pivoted to either the dash or solid line position of FIG. 1 by operation of the brake on the opposite side from which it is desired to move the tongue such that in FIG. 1 the brake on the right side would be operated to pivot the tongue to the solid line position while the brake on the left side would be operated to pivot the tongue to the dash line position as the tractor and trailer are moving forwardly and the pin 28 is in its disengaged position.

An L-shaped loading fork 40 is seen in FIGS. 1 - 3 and includes two pairs of oppositely disposed legs at 42 and 44, respectively. The fork is pivotal 90 degrees between a first loading position to a second transport position. In the loading position the legs 42 extend along the ground as seen in FIG. 2 for engagement with the lower side of the bale 46. The other legs 44 extend upwardly along the back side of the bale. A trailer frame includes forwardly extending ears 48 pivotally connected to the back side of the legs 44. A second pair of ears 50 above the ears 48 include pivotal links 52 extending rearwardly and downwardly for engagement with a clevice 54 carried on the forward end of the power cylinder shaft 56. The clevice 54 also includes a roller 58 movable in a channel 60 having a bottom wall 62, side wall 64 and top wall 66. The link 52 is positioned outside of the channel so that it may move as required as the fork is pivoted between the loading and transport positions, as seen in FIGS. 2 and 3. The channel 60 limits the power cylinder 68 against vertical movement. There are two power cylinders on opposite sides of the frame in the square in cross section channels 16. The legs 44 of the fork 40 are received in slots 70 formed in the square channels 16, as seen in FIG. 4.

It is seen in FIG. 5 that hay retaining side walls 72 are provided on the channel 16.

A front conveyor 74 is provided which includes a plurality of rollers 76 over which a belt 78 extends. A hydraulically operated drive motor 80 is connected to the front roller 82 for driving the belt 78. The motor 80 is connected by a shaft 84, as seen in FIG. 5, to the roller 82 and the shaft 84 is held stationary in openings in the channels 14 on opposite sides thereof. The front conveyor 74 extends three-quarters the length of the trailer where it is met by a second or rear conveyor 86 which may be driven by a motor 88 or by the first conveyor 78 through a connecting drive belt 90, as seen in FIG. 2. Alternatively, a clutch can be provided for disconnecting the rear conveyor 86 as desired while the front conveyor 78 is being operated. The second conveyor includes a belt 92 extending around rollers 94 and a front drive roller 96.

An alternative conveyor system is seen in FIGS. 10 - 12 and includes a pair of oppositely disposed link chains 98 movable along supports 100. The chains 98 include upstanding spaced apart teeth 102 for engagement with the hay bales 46. The link chains are movable in an open track 106, as seen in FIG. 11 on the support 100.

The unloading of the trailer is accomplished by an unloading or unrolling apparatus 110, as seen in FIG. 13. It includes upwardly extending posts 112 on opposite sides of the trailer which are provided with rearwardly extending arms 114 having inwardly pointed stub shafts 116. The arms 114 are adapted to pivot vertically as well as horizontally. The vertical pivotal movement enables the arms to automatically adjust to the diameter of the bale as it is unrolled thereby keeping it in contact with the supporting unloading conveyor 92 which is operated to cause the bale 46 to rotate. The horizontal pivotal action allows the pointed stub shafts 116 to be readily engaged and disengaged with the bale 46.

In operation it is seen that the trailer 10 is taken to the field for loading the bales 46 by being pulled by the tractor 24. The tongue 22 may be pivoted to either the solid line or dash line positions of FIG. 1 from the centerline transport position of FIG. 4 by operation of the trailer brakes 20 or by backing the tractor and holding the trailer stationary. In either event, the trailer is moved to the position in FIG. 1 relative to the tractor such that the longitudinal axis of the round bale lies horizontally and in approximately the same vertical plane as the longitudinal axis of the trailer and the path forwardly of the trailer is clear for loading of the bales 46 through operation of the loading fork 40. The fork 40 is pivoted to the loading position of FIG. 2 by extension of the hydraulic cylinders 68 which are powered by the tractor in a conventional manner. The tractor is driven forwardly allowing the legs 42 of the fork 40 to move under the bale 46 whereupon the cylinders 68 are then contracted causing the fork to pivot 90 degrees to the solid line position of FIG. 3 moving the bale onto the trailer and the front conveyor 78. In other words, the loading fork means operates by lifting the bale from a position in which its longitudinal axis is generally horizontal, to a position on the elongated frame in which its longitudinal axis is generally vertical. The conveyor 78 may now be operated to move the bale to the rear of the trailer with the first bale being moved onto the rear conveyor 92. The fork is now returned to its loading position of FIG. 2 and the next bale is loaded in the same manner and the front conveyor 78 is operated to move the second bale rearwardly to a position adjacent the first loaded bale. This operation is continued until the trailer is fully loaded as seen in FIG. 4 with four bales. The trailer tongue is now returned to its centerline transport position of FIG. 4 and locked in place by the lock pin 28 which selectively registers in either of the three openings 30, as seen in FIG. 5 in the guide support track 26.

The unloading of the trailer is accomplished in either of two ways. First, the hay may be sequentially moved on to the rear conveyor 92 and it may be operated to simply roll the bales off of the trailer onto the ground, as seen in FIG. 9, where they may be eaten by cattle or the like and they may be selectively spaced apart around the feeding area as desired. The second unloading approach involves unrolling the bale 46 by positioning the pointed stub shafts 116, as seen in FIG. 13, in the axial center of the bales 46 whereupon the supporting rear conveyor 92 is operated causing the bale 46 to unroll in a carpet fashion while the trailer is moving forwardly. The arms 114 hold the bale from moving relative to the trailer horizontally but allow it to maintain driving contact with the conveyor 92.

The conveyor may be either of the belt type, as seen in FIGS. 1 - 9, or of the link-chain type, as seen in FIGS. 10 - 12, and the two conveyors 78 and 92 may be operated together or independently through separate motors 80 and 88 or by the same motor 80 but with a clutch arrangement between the two such that conveyor 78 may be operated independently of the conveyor 92.

In summary, it can be seen that the present invention relates to a bale trailer for loading generally large bales onto the trailer at its forward end to a load position, conveying the bales along the trailer to a transport position and transporting the bales to a desired location. Such bales are generally cylindrically shaped having a longitudinal axis and a pair of end surfaces with each of the end surfaces having a transverse dimension generally parallel to the other and generally perpendicular to the longitudinal axis. The trailer is comprised of an elongated frame with front and rear ends and defining a generally horizontal bale supporting surface adapted for supporting a bale both while it is being conveyed from its load position to its transport position and while it is being transported to a desired location. As illustrated in FIG. 1, the total width of this elongated frame is generally no greater than approximately the transverse dimension of the bale supported thereon so that the bale-supporting surface is adapted to support a single roll of bales positioned side by side along the center line of the elongated frame as shown.

The L-shaped bale handling fork is pivotally connected to the frame about a generally horizontal axis at the front end of the trailer and is positioned along the center line of the frame. The fork is driven by power means independent of the movement of the bale trailer which comprises collapsible means, having one end pivotally attached to the fork and the other end pivotally connected with the trailer frame. The fork is pivotable between a first and second position whereby the bale is lifted from a ground position in which its end surfaces are generally vertical and its longitudinal axis generally horizontal, and is tilted through approximately 90° to a load position in which its longitudinal axis is generally vertical and a portion of one of its end surfaces engages and is supported by said bale-supporting surface. When the fork is in its first position, the horizontal or first-leg component extends forward closely adjacent to the ground and is adapted for positioning under and engagement with the underside of the bale in a direction generally parallel to the longitudinal axis of the bale. In this first position, the second or vertical-leg means extends upwardly at approximately right angles to the horizontal-leg means and defines a bale-supporting portion adapted for engagement with one of the end surfaces of the bale throughout a substantial portion of the bale-supporting portion. This engagement is maintained during the lifting of a bale from its ground position to its load position.

When the fork is in its second position, first-leg means extends vertically upwardly and the second-leg means extends rearwardly at approximately right angles to the first-leg means and lies substantially in the plane of the bale-supporting surface.

The trailer also includes conveying means generally centrally disposed with respect to the elongated frame and extending longitudinally of the frame at generally right angles with respect to the horizontal axis of the fork. The conveyor is disposed such that its front end is positioned directly to the rear of the bale-handling fork for engaging the bale to move it from its load position to a selected transport position along the center line of the frame. The conveying means is further positioned such that its forward end is adapted for conveying engagement with the bale when the bale has been lifted to its load position while the bale is still in engagement with the first and second leg means of the fork.

Finally, the elongated frame of the trailer includes a pulling tongue pivotally connected near the forward end thereof and adapted to pivot between a straight ahead position and at least one position to the side of said straight ahead position to allow the L-shaped fork to move forwardly under a bale for loading onto the frame.

I claim:

1. A bale trailer for loading bales of a size generally incapable of being handled and maneuvered by a single person onto the trailer at its forward end to a load position, conveying said bales along the trailer to a transport position and transporting said bales to a desired location, each of said bales having a longitudinal axis and a pair of end surfaces, said end surfaces having a transverse dimension and being generally parallel to each other and generally perpendicular to the longitudinal axis, said trailer comprising:

an elongated frame having front and rear ends and defining a generally horizontal bale supporting surface adapted for supporting a bale both while it is being conveyed from its load position to its transport position and while it is being transported to a desired location, the total width of said elongated frame being generally no greater than approximately the transverse dimension of said bale such that said bale supporting surface is adapted to support a single row of bales positioned side by side along the centerline of said elongated frame;

an L-shaped bale handling fork pivotally connected to said frame about a generally horizontal axis at said front end and being positioned on the centerline of said frame;

power means independent of the movement of said bale trailer comprising collapsible means having one end pivotally attached to said fork and the other end pivotally connected with the trailer frame for pivoting said fork between a first and second position whereby the bale is lifted from a ground position in which its end surfaces are generally vertical and its longitudinal axis is generally horizontal and is tilted through approximately 90° to a load position in which its longitudinal axis is generally vertical and a portion of one of its end surfaces engages and is supported by said bale supporting surface;

said fork in said first position having a first leg means extending forward closely adjacent the ground and adapted for positioning under, and engagement with the underside of, a bale in a direction generally parallel to the longitudinal axis of said bale and a second leg means extending upwardly at approximately right angles to said first leg and defining a bale supporting portion positioned generally at right angles to said first leg means, wherein said bale supporting portion is adapted for engagement with one of the end surfaces of said bale throughout a substantial portion of said bale supporting portion and maintaining such engagement during the lifting of a bale from its ground position to its load position;

said fork in said second position having said first leg means extending vertically upwardly and said second leg means extending rearwardly at approximately right angles to said first leg and lying substantially in the plane of said bale supporting surface;

conveying means generally centrally disposed relative to said elongated frame, extending longitudinally of said frame at generally right angles with respect to the horizontal axis of said fork and having its front end positioned directly to the rear of said bale handling fork for engaging the bale and moving it between its load position and a selected transport position along the centerline of said frame, said conveying means further being disposed relative to said fork such that the forward end of said conveying means is adapted for conveying engagement with the bale when the bale has been lifted to its load position and while the bale is still in engagement with said first and second leg means of said fork; and said frame including a pulling tongue pivotally connected near the front end thereof and adapted to pivot between a straight-ahead position and at least one position to the side of said straight-ahead position to allow said fork to move forwardly under a bale for loading onto said frame.

2. The bale trailer recited in claim 1 further comprising a second conveying means located at the rear end of said frame in communication with said first-mentioned conveying means for receiving bales from said first conveying means and unloading them from the rear end of said frame.

3. The bale trailer recited in claim 1 wherein said conveying means is a belt conveyor.

4. The bale trailer recited in claim 1 wherein said conveying means includes a chain means having upstanding teeth for engagement with said bale.

5. The bale trailer recited in claim 1 wherein said power means includes at least one hydraulic cylinder disposed on said frame and connected to said second leg means.

6. The bale trailer recited in claim 1 wherein said frame includes ground support wheels having brakes selectively and independently operable when said trailer is being pulled to cause said tongue and trailer to pivot relative to each other into at least one position to the side of said straight-ahead position.

7. The bale trailer of claim 1 wherein said L-shaped loading fork has a width greater than one-half the width of said elongated frame.

8. The bale trailer of claim 1 wherein said L-shaped loading fork has a width approximately equal to the width of said elongated frame.

9. A bale trailer for loading and transporting bales of a size generally incapable of being handled and maneuvered by a single person, comprising:
   an elongated frame having front and rear ends;
   an L-shaped bale handling fork pivotally connected to said frame at said front end and being positioned on the centerline of said frame;
   power means for pivoting said fork between a first and second position, including at least one hydraulic cylinder disposed on said frame and connected to said second leg means wherein each cylinder in said power means comprises:
      a cylinder and shaft horizontally disposed along said frame;
      a roller at the outer end of said shaft movable in a guide channel which limits the vertical movement of said shaft as it moves horizontally, and
      pivotal links disposed outside of said guide channel which connect said shaft to said second leg means;
   said fork in said first position having a first leg means extending forward closely adjacent the ground for positioning under a bale and a second leg means extending upwardly;
   said fork in said second position having said first leg means extending upwardly and said second leg means extending rearwardly;
   conveying means for moving a bale from said front end to said rear end along the centerline of said frame; and
   said frame including a pulling tongue pivotally connected near the front end thereof and adapted to pivot between a straight-ahead position and at least one position to the side of said straight-ahead position to allow said fork to move forwardly under a bale for loading onto said frame.

* * * * *